United States Patent
Weitkemper et al.

(10) Patent No.: US 10,411,938 B2
(45) Date of Patent: Sep. 10, 2019

(54) TRANSMIT DIVERSITY FROM ORTHOGONAL DESIGN FOR FBMC/OQAM

(71) Applicant: NTT DOCOMO, INC., Tokyo (JP)

(72) Inventors: Petra Weitkemper, Munich (DE); Katsutoshi Kusume, Munich (DE); Jamal Bazzi, Munich (DE); Mikio Iwamura, Munich (DE)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/563,027

(22) PCT Filed: Apr. 1, 2016

(86) PCT No.: PCT/EP2016/057241
§ 371 (c)(1),
(2) Date: Sep. 29, 2017

(87) PCT Pub. No.: WO2016/156580
PCT Pub. Date: Oct. 6, 2016

(65) Prior Publication Data
US 2018/0375704 A1 Dec. 27, 2018

(30) Foreign Application Priority Data
Apr. 1, 2015 (EP) .................................... 15162256

(51) Int. Cl.
*H04L 27/26* (2006.01)
*H04L 1/06* (2006.01)

(52) U.S. Cl.
CPC .......... *H04L 27/264* (2013.01); *H04L 1/0668* (2013.01); *H04L 27/2698* (2013.01)

(58) Field of Classification Search
CPC .. H04L 27/264; H04L 1/0668; H04L 27/2698
See application file for complete search history.

(56) References Cited

U.S. PATENT DOCUMENTS

| | | | |
|---|---|---|---|
| 10,063,401 B2* | 8/2018 | Sun | H04L 27/264 |
| 2015/0180697 A1* | 6/2015 | Phan Huy | H04B 7/0669 375/267 |
| 2017/0359204 A1* | 12/2017 | Park | H04L 25/03057 |

OTHER PUBLICATIONS

S. M. Alamouti: "A Simple Transmit Diversity Technique for Wireless Communications", IEEE Journal on Select Areas in Communications, vol. 16, No. 8, Oct. 1998 (8 pages).

(Continued)

*Primary Examiner* — Jaison Joseph
(74) *Attorney, Agent, or Firm* — Osha Liang LLP

(57) ABSTRACT

How to apply an Alamouti like space-time coding (or transmit diversity) to a Filter Bank Multicarrier (FBMC) transmission using Offset QAM (OQAM). In FBMC, due to the orthogonality in the real domain only, an intrinsic interference results thereof for the imaginary component. Simply adapting the Alamouti scheme to FBMC OQAM is not obvious since the intrinsic interference terms are not equivalent at each antenna since it depends on the surrounding symbols. The application proposes to use a precoding symbol chosen to cancel out (zero) the intrinsic interference individually for each antenna, ie a code rate of 1/2 (sending one data symbol requires two time units). A more elaborated embodiment proposes to choose the contiguous precoding symbols such that a virtual QAM Alamouti scheme is achieved, without rate loss.

10 Claims, 8 Drawing Sheets

(56) References Cited

OTHER PUBLICATIONS

M. Bellanger, "Transmit Diversity in Multicarrier Transmission Using OQAM Modulation," in Proc. The 3rd Int. Symposium on Wireless Pervasive Computing (ISWPC'08), pp. 727-730, May 2008 (4 pages).
H. Lin, C. Lele, and P. Siohan, "A Pseudo Alamouti Transceiver Design for OFDM/OQAM Modulation With Cyclic Prefix," in Proc. SPAWG, 2009 (5 pages).
C. Lele, P. Siohan, R. L-egouable, "The Alamouti Scheme with CDMA-OFDM/OQAM" Journal on Advances in Signal Processing, vol. 2010 (13 pages).
M. Renfors, T. Ihalainen, and T. H. Stitz, "A Block-Alamouti Scheme for Filter Bank Based Multicarrier Transmission," Proceedings of the European Wireless Conference 2010 (7 pages).
Rostom Zakaria et al: "A Novel Filter-Bank Multicarrier Scheme to Mitigate the Instrinsic Interference Application to MIMO Systems," IEEE Transactions on Wireless Communications, IEEE Service Center, Piscataway, NJ, US, vol. 11, No. 3, Mar. 1, 2012 (12 pages).

\* cited by examiner

TRANSMIT DIVERSITY FROM ORTHOGONAL DESIGN FOR FBMC/OQAM

FIELD OF THE INVENTION

The present technology relates to a method and apparatus for transmitting a multicarrier signal, wherein said signal is of the offset quadrature amplitude modulation, OQAM, type comprising symbols in the time-frequency space, wherein the symbols include a data containing symbol and a precoding symbol.

BACKGROUND OF THE INVENTION

Transmit diversity is considered to be important since it can be applied at transmitter side to improve the reliability of communication link even if channel state information is not available at the transmitter. That Includes high speed mobility scenarios where feedback information from receiver to transmitter becomes quickly obsolete and also broadcast scenarios.

Alamouti code, which is described in S. M. Alamouti: "A simple transmit diversity technique for wireless communications", IEEE Journal on Selected Areas in Communications, vol. 16, no. 8, October 1998, is a popular transmit diversity scheme from orthogonal design for two transmit antennas since it has the following desired properties of:
1. Full diversity
2. Full rate (no rate loss)
3. Simple linear receiver, i.e. the processing required at the receiver scales linearly in the number of transmit antennas.

Alamouti code has been widely adopted, e.g. for LTE OFDM systems.

However, the direct application of Alamouti scheme for FBMC/OQAM is not possible So far, considerable amount of efforts have been spent by many industries and universities to find competitive solution for transmit diversity with FBMC/OQAM, but all the state-of-the-art solutions have some drawbacks as explained later.

Before explaining the problem of achieving transmit diversity for FBMC/OQAM, the Alamouti transmission scheme as applied in LTE should be reviewed as illustrated in FIG. 2.

FIG. 2 shows a transmission scheme based on OFDM, wherein the complex QAM symbols $s_1$ and $s_2$ are transmitted from the first transmit antenna Tx1 using the two resources $(m_0,n_0)$ and $(m_0+1,n_0)$ where $m_0$ and $n_0$ denote subcarrier and time indices, respectively. From the second transmit antenna Tx2 their complex conjugate versions of the QAM symbols are transmitted with or without taking its minus by using the same two resources, but now the used resources for $s_1$ and $s_2$ are exchanged. If it is assumed that the complex-valued channel frequency responses on subcarriers $m_0$ and $m_0+1$ of symbol $n_0$ are quasi equivalent, denoted as $H^{(1)}$ and $H^{(2)}$ for transmit antennas Tx1 and Tx2, respectively, one can write the received signals for the subcarriers $m_0$ and $m_0+1$ as shown in equations (1) and (2):

$$y_{m_0,n_0} = H^{(1)}s_1 - H^{(2)}s^*_2 + \eta_{m_0,n_0} \quad (1)$$

$$y_{m_0+1,n_0} = H^{(1)}s_2 + H^{(2)}s^*_1 + \eta_{m_0+1,n_0} \quad (2)$$

where $\eta_{m_0,n_0}$ is an AWGN. With some arrangement of these receive signals, the following linear equation system is obtained:

$$\begin{bmatrix} y_{m_0,n_0} \\ y^*_{m_0+1,n_0} \end{bmatrix} = \begin{bmatrix} H^{(1)} & -H^{(2)} \\ H^{(2)*} & H^{(1)*} \end{bmatrix} \begin{bmatrix} s_1 \\ s^*_2 \end{bmatrix} + \begin{bmatrix} \eta_{m_0,n_0} \\ \eta^*_{m_0+1,n_0} \end{bmatrix} \rightarrow y = Hs + \eta \quad (3)$$

Then, at the receiver the following linear processing is performed:

$$\begin{bmatrix} \hat{s}_1 \\ \hat{s}_2 \end{bmatrix} = \frac{1}{|H^{(1)}|^2 + |H^{(2)}|^2} H^H y = \begin{bmatrix} s_1 \\ s^*_2 \end{bmatrix} + \frac{1}{|H^{(1)}|^2 + |H^{(2)}|^2} H^H \eta. \quad (4)$$

The diversity order of 2 is achieved assuming that the channel response from the transmit antennas Tx1 and Tx2 are Independent.

To summarize, the main idea of Alamouti coding is that it is an orthogonal design since only linear combination is needed and it incurs no rate loss because two resources are utilized to deliver two data symbols.

Now, fundamental properties of FBMC/OQAM that are essential for understanding why the Alamouti scheme cannot be directly applied to FBMC/OQAM should be reviewed on the basis of FIG. 3. In the single antenna, single input, single output (SISO) system shown in FIG. 3, a real-valued pulse amplitude modulation (PAM) signal $a_{m_0,n_0}$ is transmitted using the resource $(m_0,n_0)$.

The respective baseband equivalent receive signal may be written as $$y_{m_0,n_0} = H_{m_0,n_0}(a_{m_0,n_0} + jI_{m_0,n_0}) + \eta_{m_0,n_0} \quad (5)$$

where $$I_{m_0,n_0} = \sum_{\substack{(p,q) \neq (0,0) \\ p,q \in \{-1,0,+1\}}} a_{m_0+p,n_0+q} \langle g \rangle_{m_0+p,n_0+q} \quad (6)$$

is the so called intrinsic interference coming from data symbols on neighbor subcarriers and symbols. The coefficients $\langle g \rangle_{m_0+p,n_0+q}$ are called ambiguity function that captures the characteristic of the used prototype filter. Here, it is assumed that a good localized filter is used such that the intrinsic interference is caused only by the immediate neighbor resources, but in general other resources that are located farther apart could also contribute to form the intrinsic interference.

It can be seen that, unlike OFDM, the subcarrier signal is not orthogonal in the complex domain. It is, however, possible to restore the orthogonality in the real domain by channel equalization and taking its real part as $$\hat{a}_{m_0,n_0} = \mathrm{Re}\left\{ \frac{y_{m_0,n_0}}{H_{m_0,n_0}} \right\} \approx a_{m_0,n_0} + \eta'_{m_0,n_0} \quad (7)$$

As it can be seen next, there is the consequence on the transmit diversity from the fact that FBMC/OQAM loses the complex orthogonality.

For transmit diversity for FBMC/OQAM, the system model shown in FIG. 4 is considered.

In the scenario shown in FIG. 4, two real-valued PAM signals $a_1$ and $a_2$ are transmitted using the two resources $(m_0,n_0)$ and $(m_0+1,n_0)$ from the transmit antenna Tx1. From transmit antenna Tx2, these PAM symbols are transmitted with and respectively without taking its minus by using the same two resources but now the used resources for $a_1$ and $a_2$ are exchanged as can be seen in FIG. 4. With the same assumptions on $H^{(1)}$ and $H^{(2)}$ from transmit antennas Tx1 and Tx2, the receive signals for the subcarriers $m_0$ and $m_0+1$ read as $$y_{m_0,n_0} = H^{(1)} \underbrace{(a_1 + jI^{(1)}_{m_0,n_0})}_{\triangleq s_1} - H^{(2)} \underbrace{(a_2 - jI^{(2)}_{m_0,n_0})}_{\neq s_2^*} + \eta_{m_0,n_0} = \quad (8)$$

$$H^{(1)} s_1 - H^{(2)}(s_2^* + jI_1) + \eta_{m_0,n_0}$$

$$y_{m_0+1,n_0} = H^{(1)} \underbrace{(a_2 + jI^{(1)}_{m_0+1,n_0})}_{\triangleq s_2} + H^{(2)} \underbrace{(a_1 + jI^{(2)}_{m_0+1,n_0})}_{\neq s_2^*} + \eta_{m_0+1,n_0} = \quad (9)$$

$$H^{(1)} s_2 + H^{(2)}(s_1^* + jI_2) + \eta_{m_0+1,n_0}$$

where the complex-valued "virtual symbols" $s_1$ and $s_2$ are defined as the real-valued desired signal plus intrinsic interference.

In an attempt to implement the Alamouti scheme, the following is introduced:

$$I_1 \triangleq I_{m_0+1,n_0}^{(1)} - I_{m_0,n_0}^{(2)} \quad (10)$$

$$I_2 \triangleq I_{m_0,n_0}^{(1)} + I_{m_0+1,n_0}^{(2)} \quad (11)$$

With some arrangement of these received signals, the following linear equation system is obtained in a similar way as the Alamouti scheme for OFDM as explained above:

$$\begin{bmatrix} y_{m_0,n_0} \\ y_{m_0+1,n_0}^* \end{bmatrix} = \underbrace{\begin{bmatrix} H^{(1)} & -H^{(2)} \\ H^{(2)*} & H^{(1)*} \end{bmatrix} \begin{bmatrix} s_1 \\ s_2^* \end{bmatrix}}_{\text{Orthogonal design}} + j \underbrace{\begin{bmatrix} -H^{(2)} & I_1 \\ H^{(2)*} & I_2 \end{bmatrix}}_{\text{Orthogonality is lost}} + \begin{bmatrix} \eta_{m_0,n_0} \\ \eta_{m_0+1,n_0}^* \end{bmatrix} \quad (12)$$

It can however be observed that the orthogonality is lost due to the second term on the right hand side of the equation system. The main reason for this is that the intrinsic interferences for the transmitted signals from different antennas are not equivalent since the surrounding data of each time-frequency resource grid are different due to the random nature of data signals. This explains the problem that the transmit diversity from the orthogonal design following the Alamouti coding scheme cannot be applied to FBMC/OQAM in a straightforward manner.

Several attempts to address this problem of non-orthogonality can be found in the literature and will be discussed in the following:

In M. Bellanger, "Transmit diversity in multicarrier transmission using OQAM modulation," in Proc. The 3rd Int. Symposium on Wireless Pervasive Computing (ISWPC'08), pp. 727-730, May 2008, the author proposes a simple delay diversity where no effort is made to realize orthogonality. Although this approach does not have any rate loss, due to its non-orthogonality, it requires very complex maximum likelihood receiver and it does not achieve full diversity.

The authors in H. Lin, C. Lele, P. Siohan, "A pseudo Alamouti transceiver design for OFDM/OQAM modulation with cyclic prefix," in Proc. SPAWC, 2009 propose to introduce a cyclic prefix which is common for OFDM, but not for FBMC/OQAM.

Because of the cyclic prefix, the orthogonality can be realized, but it results in a rate loss.

Another approach, presented in by C. Lele, P. Siohan, R. Legouable, "The Alamouti scheme with CDMA-OFDM/OQAM", EURASIP Journal on Advances in Signal Processing, 2010, suggests the spreading and dispreading using Walsh-Hadamard codes for nullifying intrinsic interferences. Thanks to spreading/dispreading, orthogonality can be achieved, but a rate loss results.

In M. Renfors, T. Ihalainen, T. H. Stitz, "A Block-Alamouti Scheme for Filter Bank Based Multicarrier Transmission," Proceedings of the European Wireless Conference 2010, a block Alamouti scheme using some zero symbols is introduced based on orthogonal design. The idea is to apply the Alamouti scheme to two areas of symbols instead of two symbols such that the intrinsic interference caused from 2 different transmit antennas are equivalent. Some zero symbols are added around the areas to avoid "edge effect". The zero symbols lead to rate loss. Besides, the applicability of the scheme may be limited since channel has to be constant over blocks that may not hold for many propagation scenarios, e.g. for mobile scenarios.

To summarize, there has not been a solution in the literature that can realize the orthogonal design without rate loss.

SUMMARY OF THE INVENTION

According to one embodiment, there is provided a method for transmitting a multicarrier signal, wherein said signal is of the offset quadrature amplitude modulation, OQAM, type comprising symbols in the time-frequency space, wherein the symbols Include a data containing symbol and a pre-coding symbol, wherein the precoding symbol is selected to carry data in both the in-phase and quadrature components of the data containing symbol when received by a receiver.

This method has the effect and advantage that a receiver may obtain, besides the real-valued data obtained from an in-phase component of the transmitted signal, also data from the quadrature component (or alternatively: besides the real-valued data obtained from a quadrature component of the transmitted signal, also data from the in-phase component), otherwise being the intrinsic interference, after demodulating the received signal on a transmission resource. In this manner, complex-valued QAM symbols may be equivalently transmitted on a single transmission resource, provided that the precoding symbol is selected accordingly. This has the further effect, that the code rate can be improved, since complex-valued instead of real-valued symbols may be transmitted.

In one example, the data containing symbol is only a real-valued symbol or only an Imaginary valued symbol.

In another example of the transmission method, said data containing symbol in the time-frequency space is formed by modulating a real-valued symbol and an intrinsic interference corresponds to the real or imaginary part of the demodulated signal at the receiver and is forced to carry data by suitably selecting said precoding symbol, or said data containing symbol in the time-frequency space is formed by modulating an imaginary-valued symbol and an intrinsic interference corresponds to the real-valued part of the demodulated signal at said receiver and is forced to carry data by suitably selecting said precoding symbol.

This has the effect and advantage that a real-valued or an imaginary-valued symbol symbol can be transmitted to the receiver.

In another example, said offset quadrature amplitude modulation is applied with the filter bank multicarrier FBMC transmission.

This has the effect and advantage that the benefits and advantages of the present Invention are applicable also, and in particular, to FBMC/OQAM transmission schemes.

In another example, the selecting of the precoding symbol is performed in order to realize an orthogonal space-time or space-frequency code in a system using OQAM signalling.

This has the effect and advantage that demodulation of received signals in case of transmit diversity may have only linear complexity in the number of antennas.

In another example, wherein two complex-valued quadrature amplitude modulation QAM symbols $s_1, s_2$ are to be transmitted, real parts of the data containing QAM symbols $s_1, s_2$ are transmitted using resources $(m_0, n_0)$ and $(m_0+u, n_0+v)$ in the time-frequency domain by a first antenna, and the real parts of the data containing symbols $-s_2, s_1$, are transmitted using resources $(m_0, n_0)$ and $(m_0+u, n_0+v)$ in the time-frequency domain by a second antenna, and wherein u,v are non-zero.

This has the effect and advantage that transmit diversity according to the scheme of Alamouti may be applied.

In another example, wherein two complex-valued quadrature amplitude modulation QAM symbols $s_1, s_2$ are to be transmitted, real parts of the data containing QAM symbols $s_1, s_2$ are transmitted using resources $(m_0, n_0)$ and $(m_0+u, n_0)$ in the time-frequency domain by a first antenna, and the real parts of the data containing symbols $-s_2, s_1$, are transmitted using resources $(m_0, n_0)$ and $(m_0+u, n_0)$ in the time-frequency domain by a second antenna, and wherein u is non-zero.

This has the effect and advantage that transmit diversity according to the scheme of Alamouti may be applied.

In another example, wherein two complex-valued quadrature amplitude modulation QAM symbols $s_1, s_2$ are to be transmitted, real parts of the data containing QAM symbols $s_1, s_2$ are transmitted using resources $(m_0, n_0)$ and $(m_0, n_0+u)$ in the time-frequency domain by a first antenna, and the real parts of the data containing symbols $-s_2, s_1$, are transmitted using resources $(m_0, n_0)$ and $(m_0, n_0+u)$ in the time-frequency domain by a second antenna, and wherein u is non-zero.

This has the effect and advantage that transmit diversity according to the scheme of Alamouti may be applied.

In another example, one precoding symbol is used for each QAM symbol transmitted by each antenna, wherein the precoding symbols are selected to force the intrinsic Interference at the receiver to deliver desired real or Imaginary components of the transmitted symbols to transmit useful data by the intrinsic interference part of the transmitted symbols when received by the receiver.

This has the effect and advantage that the method has a code rate of 1 since transmission of two complex valued data symbols require four real-valued transmission resources.

According to an embodiment, there is provided an apparatus for transmitting a multicarrier signal wherein said signal is of the offset quadrature amplitude modulation, OQAM, type comprising symbols in the time-frequency space, wherein the symbols include
  a data containing symbol and
  a precoding symbol; wherein
 a selector for selecting the precoding symbol (x) so that data is carried in both the in-phase and quadrature components of the data containing symbol (y) when received by a receiver,
 a modulator for forming said data containing symbol in the time-frequency space by modulating a real-valued symbol and an intrinsic interference corresponds to the imaginary part of the demodulated signal at said receiver and is forced to carry data by suitably selecting said precoding symbol, or for forming said data containing symbol in the time-frequency space by modulating an imaginary-valued symbol and an intrinsic interference corresponds to the real-valued part of the demodulated signal at said receiver and is forced to carry data by suitably selecting said precoding symbol.

The effects and advantages achieved by the apparatus correspond to the effects and advantages of the embodiments of the method which have been described in detail above.

The apparatus may further be adapted to comprise the features according to one of the embodiments of the Invention. For that purpose the apparatus may include one or more modules for implementing these features.

According to another embodiment, there is provided a method for receiving a multicarrier signal which is transmitted according to one of the above methods for transmitting, wherein, in the method for receiving data is obtained from demodulating the in-phase and quadrature components of the data containing symbol, when received by a receiver.

DETAILED DESCRIPTION

Figure 1:
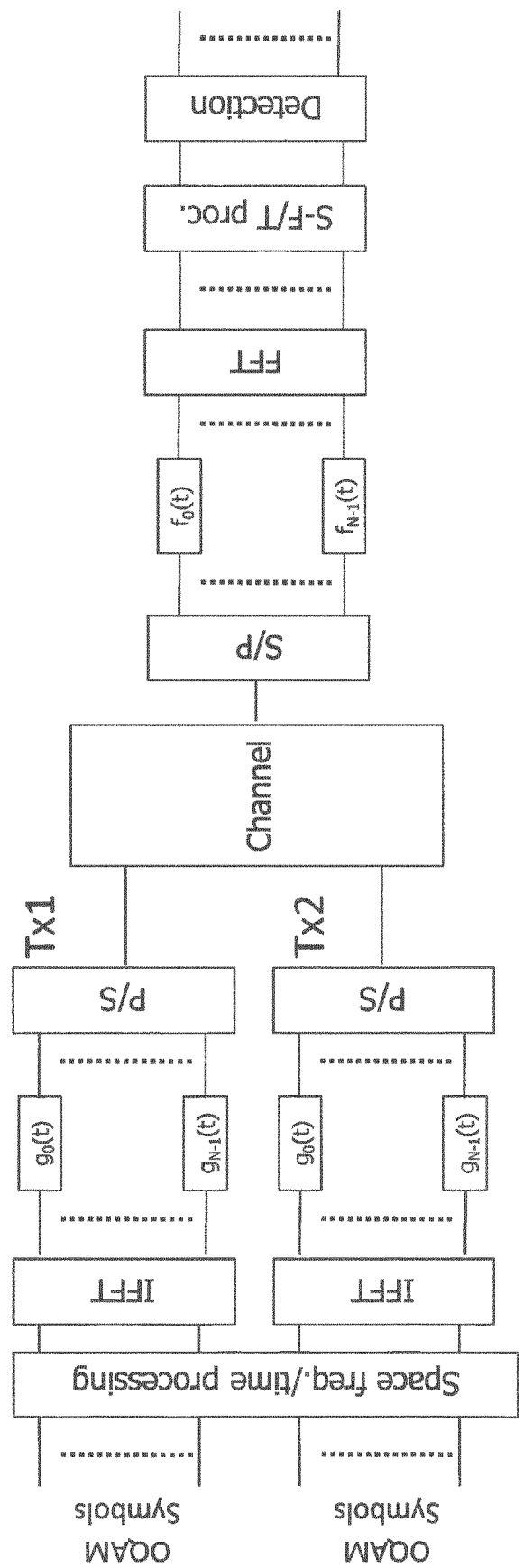
FIG. 1 shows the architecture of an FBMC/OQAM transmission scheme with transmit diversity using two transmit antennas.
Figure 2:
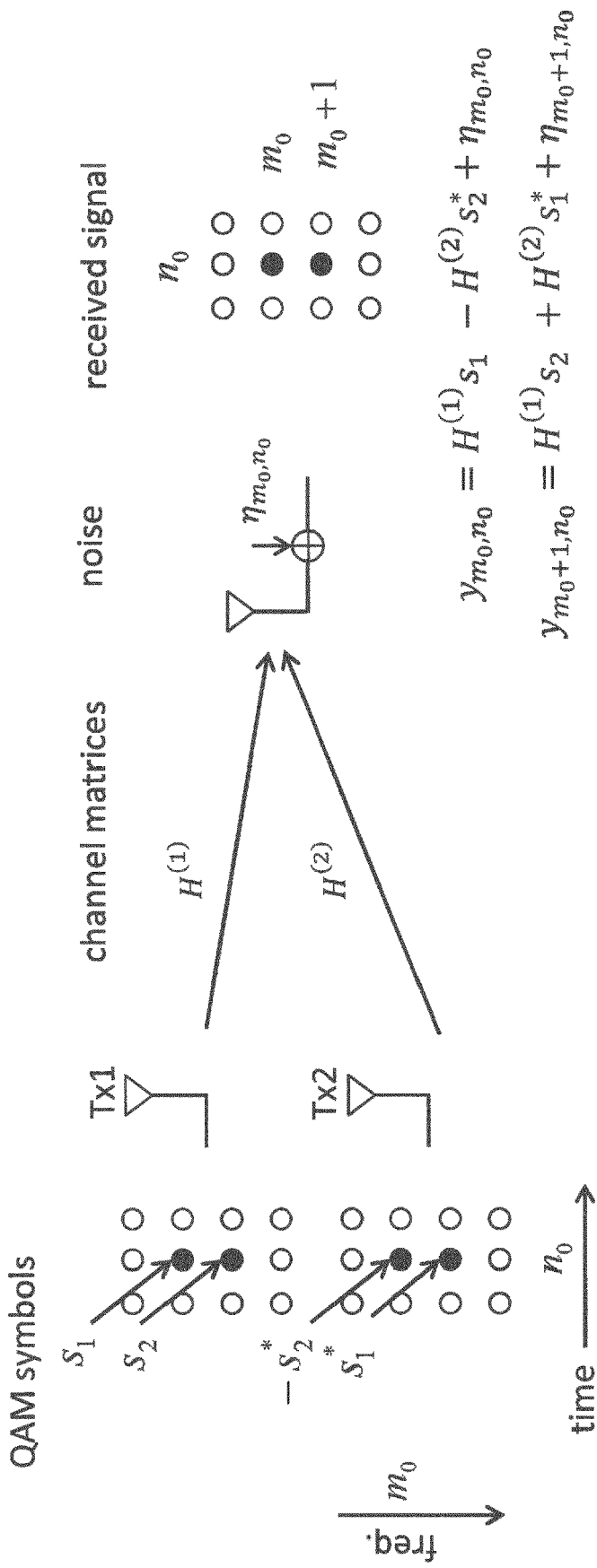
FIG. 2 shows an Alamouti scheme for transmit diversity as for example used in LTE.
Figure 3:
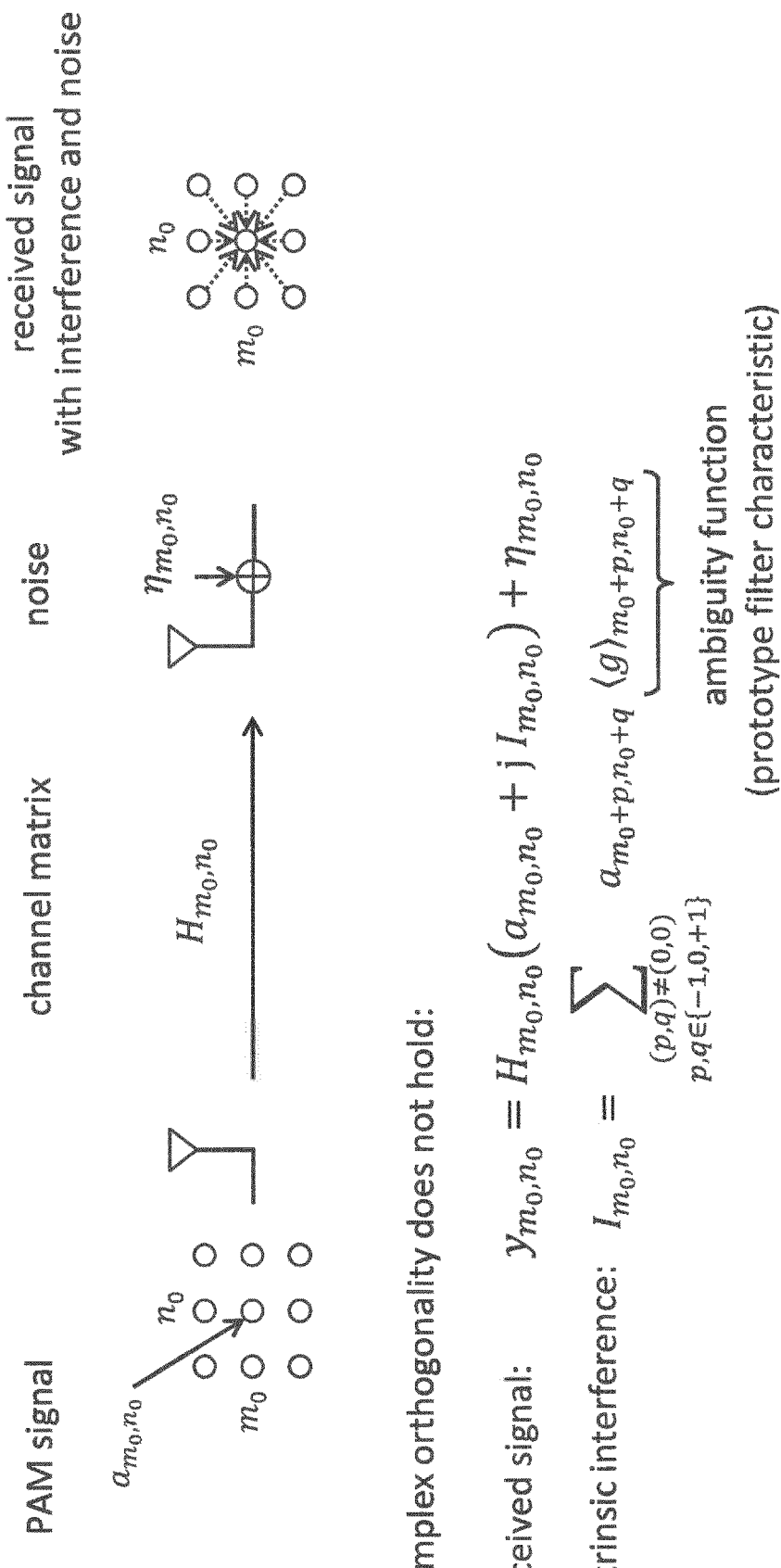
FIG. 3 shows a single Input, single output channel model where a PAM signal is transmitted through a single transmit antenna based on FBMC/OQAM.
Figure 4:
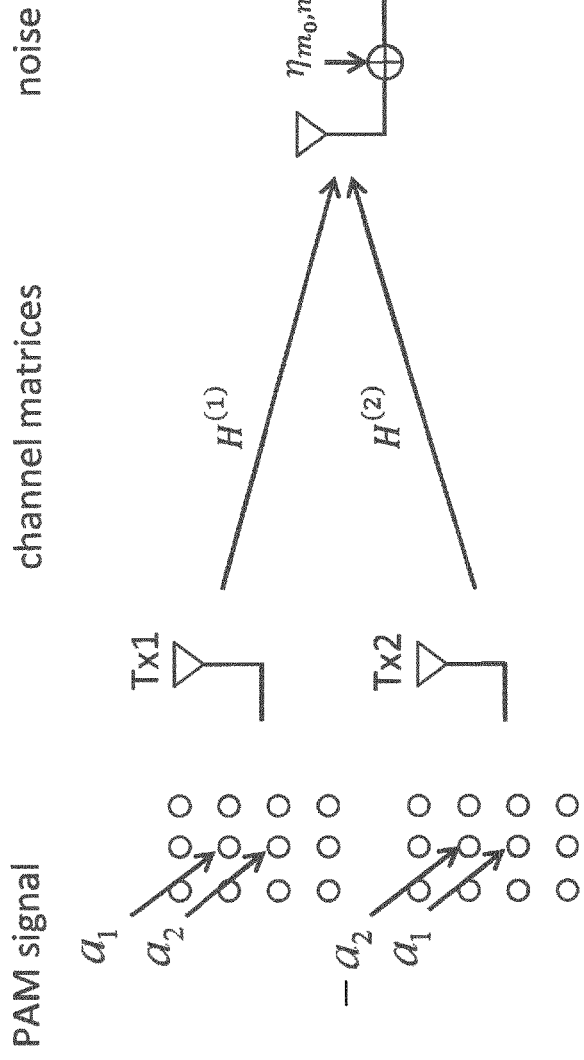
FIG. 4 shows a transmission scheme with two transmit antennas based on FBMC/OQAM where orthogonally is lost through intrinsic interference.

At first, some terms used in the description will be defined in the following list of abbreviations.
  AWGN Additive White Gaussian Noise
  FBMC Filter Bank Multicarrier
  LTE Long Term Evolution (mobile phone standard)
  OFDM Orthogonal Frequency Division Multiplexing
  OQAM Offset Quadrature Amplitude Modulation
  PAM Pulse Amplitude Modulation
  QAM Quadrature Amplitude Modulation
  SISO Single-In-Single-Out The present invention is concerned with filter bank multicarrier (FBMC) offset quadrature amplitude modulation (OQAM) transmission with the so called transmit diversity technique using two transmit antennas as illustrated in FIG. 1.

One objective is to design a transmit diversity scheme from orthogonal design for FBMC/OQAM similar to the above described Alamouti scheme which is, for example, applied to LTE OFDM system.

Figure 5:
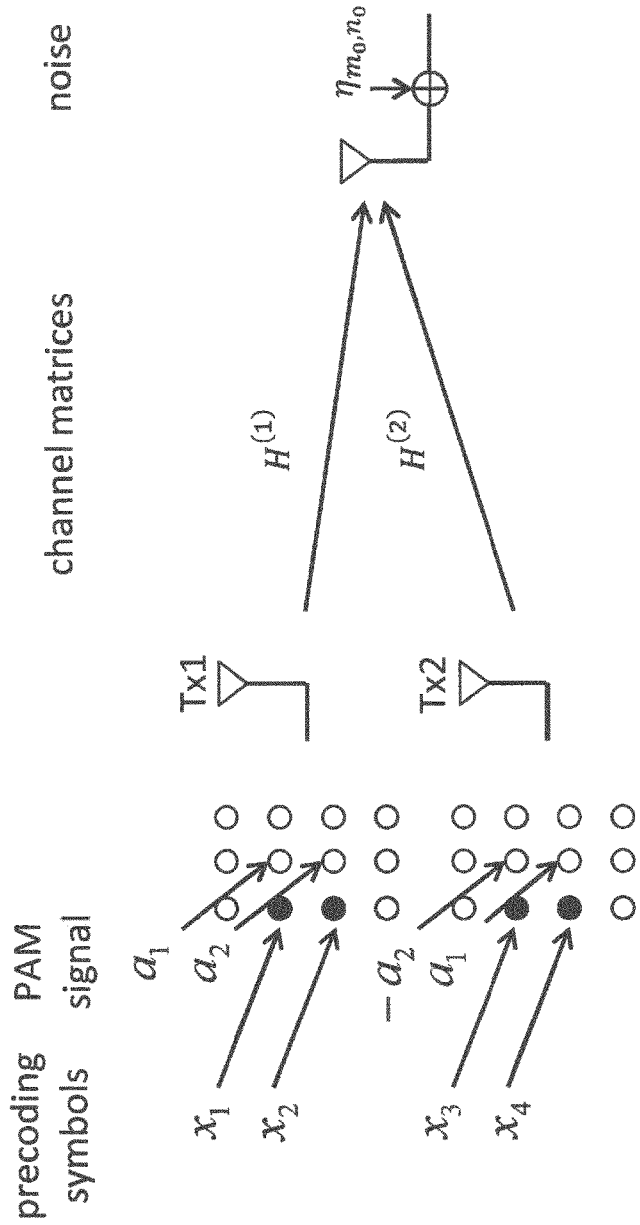
FIG. 5 shows an orthogonal transmission scheme with transmit diversity through two transmit antennas based on FBMC/OQAM where intrinsic interference is cancelled using one precoding symbol per PAM signal.

A first approach to achieve orthogonality in a FBMC/OCAM by cancelling out intrinsic interference is described in the following. In this first approach orthogonality is achieved by introducing precoding symbols, specifically as shown in FIG. 5, four precoding symbols are introduced, i.e., two precoding symbols for each transmit antenna. As it will become apparent, such use of precoding to cancel intrinsic interference achieves orthogonality but has the problem of achieving only a low code rate since some transmission resources are not used to transmit useful data. The present invention will improve this aspect.

In the first approach, precoding symbols are chosen such as to cancel the intrinsic interferences as follows:

$$y_{m_0,n_0} = H^{(1)}\left(a_1 + j\overline{I^{(1)}_{m_0,n_0}}^{\to 0}\right) - H^{(2)}\left(a_2 - j\overline{I^{(2)}_{m_0,n_0}}^{\to 0}\right) + \eta_{m_0,n_0} \quad (13)$$

$$y_{m_0+1,n_0} = H^{(1)}\left(a_2 + j\overline{I^{(1)}_{m_0+1,n_0}}^{\to 0}\right) + H^{(2)}\left(a_1 + j\overline{I^{(2)}_{m_0+1,n_0}}^{\to 0}\right) + \eta_{m_0+1,n_0}$$

Here, $y_{m_0,n_0}$ is the received signal at the resource at $(m_0,n_0)$ in the time-frequency domain, $\eta_{m_0,n_0}$ is AWGN and $I_{m_0,n_0}^{(1)}$ and $I_{m_0,n_0}^{(2)}$ being the Intrinsic interference from the first and the second antenna at resource $(m_0,n_0)$ respectively. The precoding symbols $x_1, x_2, x_3, x_4$ are chosen to cancel (zero) the intrinsic interference individually for each antenna. Specifically, the symbols $x_1$, $x_2$ are chosen to cancel the intrinsic interferences $I_{m_0,n_0}^{(1)}$ $I_{m_0+1,n_0}^{(1)}$ of the first antenna and $x_3$, $x_4$ are chosen to cancel the intrinsic interferences $I_{m_0,n_0}^{(2)}$ $I_{m_0+1,n_0}^{(2)}$ of the second antenna.

The transmission scheme according to the first approach leads to an orthogonal design and achieves a code rate of 1/2, i.e. the transmission of one data symbol requires two time units since one precoding symbol is transmitted per data symbol.

Figure 6:
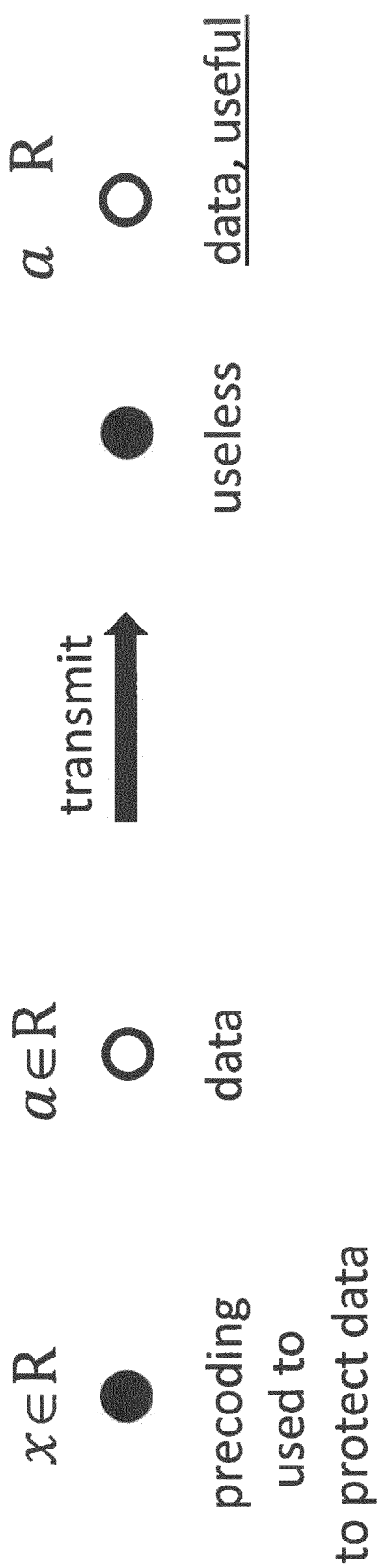
FIG. 6 shows the principle of transmitting one PAM symbol using two resources.

FIG. 6 shows the principles of FIG. 5 yet simplified where only two transmission resources and only a single antenna is considered for simplicity. One of the resources is used for sending the precoding signal that is intended to protect useful data sent using another resource to somewhat "combat" with pure imaginary intrinsic interference observed at the receiver. This means that one real-valued PAM symbol is transmitted using two resources. Hence FIG. 6 illustrates this principle of using a precoding symbol x to "protect" a real-valued data symbol α to be transmitted, wherein the precoding symbol serves to cancel out intrinsic interference and the value received at the resource used for transmission of the precoding symbol is not otherwise used ("useless") at the receiver side.

It can be seen from FIG. 5 and FIG. 6 that real-valued PAM symbols are considered for transmission, i.e., real values are transmitted so that the quadrature component of the data symbol obtained at the receiver is not used for the transfer of useful data; instead, the quadrature component is undesired and is forced to zero using precoding. Alternatively, real values are transmitted so that the quadrature component of the data symbol obtained at the receiver is not used for the transfer of useful data; instead, the in-phase component is undesired and is forced to zero using precoding.

Figure 7:
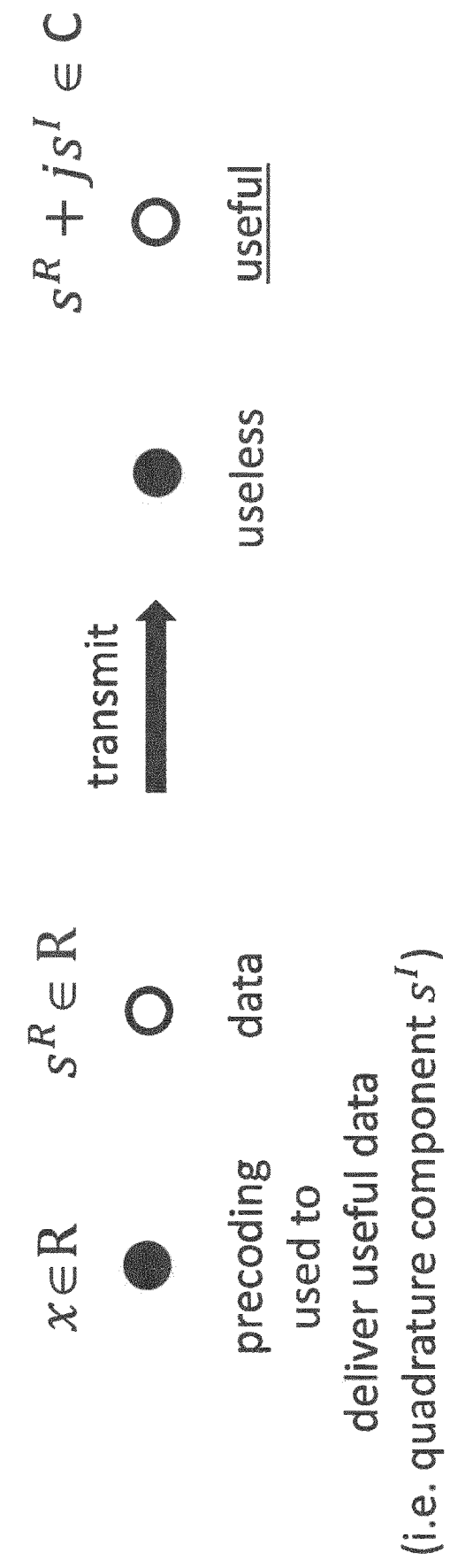
FIG. 7 shows the principle of transmitting one QAM symbol using two resources.

The present invention uses complex-valued QAM symbols for transmission as illustrated in FIG. 7. FIG. 7 highlights the difference to the previously described first approach summarized in FIG. 6, and the present invention. An important difference and aspect of the present invention is to exploit precoding symbols to force the intrinsic interference to a specific value so that the quadrature component of the data signal received at the receiver carries useful data, i.e. the imaginary part of the transmitted QAM symbol.

Like FIG. 6, FIG. 7 focuses on only two resource grids and only a single antenna is considered for transmission. In the present invention, the principles of which are demonstrated in FIG. 7, two resources are used, like in FIG. 6, one of which is a precoding signal. In contrast to the scheme of FIG. 6, the precoding signal is designed to deliver useful data in the pure real or imaginary domain observed at the receiver. This means that one complex-valued QAM symbol can be transmitted using two resources, one resource for the transmission of the real-valued data to be transmitted as first useful data, and one resource for transmitting the real-valued preceding symbol, which forces the imaginary or real part respectively to a certain value, which corresponds to the second useful data, which is to be transmitted.

Figure 8:
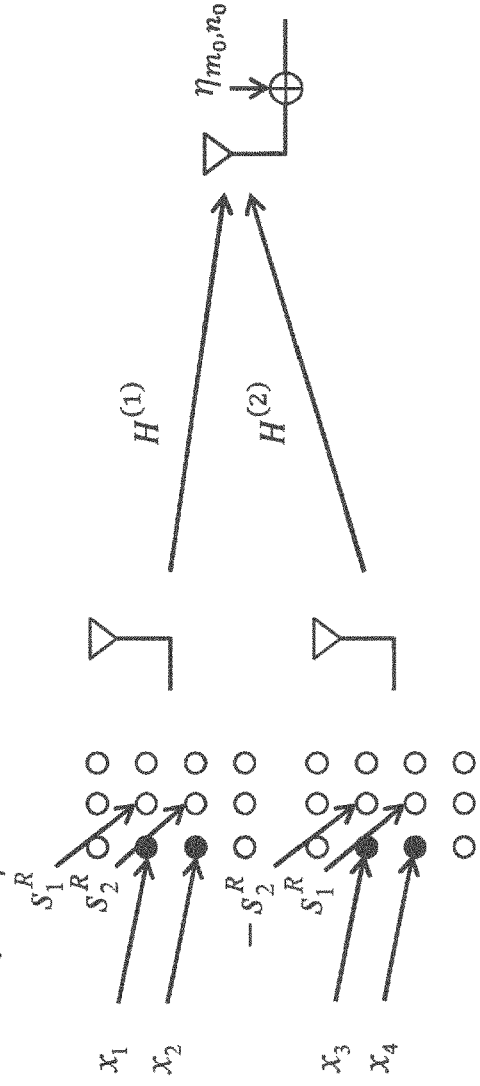
FIG. 8 shows an orthogonal transmission scheme based on FBMC/OQAM with transmit diversity through two transmit antennas where precoding symbols are chosen such that, when being demodulated at a receiver, to carry data in both the in-phase and quadrature components of the data containing symbol.

An embodiment of the present invention is illustrated in FIG. 8 where two QAM symbols are to be transmitted and two antennas are used for transmit diversity.

To further elaborate, formula (5) can be written as follows:

$$y_{m_0,n_0} = H_{m_0,n_0}(a_{m_0,n_0} + j\langle g\rangle_{m_0,n_0-1}x + I'_{m_0,n_0})) + \eta_{m_0,n_0} \quad (14)$$

where, corresponding to formula (6), it can be defined $$I'_{m_0,n_0} = I_{m_0,n_0} - \langle g\rangle_{m_0,n_0-1}x. \quad (15)$$

Here, the choice of x highlights the difference between the above-described approach to achieve orthogonality and the present invention. With the above-described approach, x may be chosen, for example, as $$x = \frac{-I'_{m_0,n_0}}{\langle g\rangle_{m_0,n_0-1}} \quad (16)$$

so that formula (14) at the receiver becomes $$y_{m_0,n_0} = H_{m_0,n_0}a_{m_0,n_0} + \eta_{m_0,n_0}. \quad (17)$$

It can be seen that the intrinsic interference is cancelled by the precoding symbol and one real-valued interference-free PAM symbol $a_{m_0,n_0}$ is transmitted and received.

In the case of the present invention, x is chosen as follows (compare to formula (16)):

$$x = \frac{-I'_{m_0,n_0} + b_{m_0,n_0}}{\langle g\rangle_{m_0,n_0-1}} \quad (18)$$

so that formula (14) at the receiver becomes (compare to formula (17)):

$$y_{m_0,n_0} = H_{m_0,n_0}(a_{m_0,n_0} + jb_{m_0,n_0}) + \eta_{m_0,n_0} \quad (19)$$

It can be observed that one complex-valued interference-free QAM symbol $s_{m_0,n_0} = a_{m_0,n_0} + jb_{m_0,n_0}$ is received. This means twice the data rate as compared to the first approach with a received signal according to formula (17), where one real-valued PAM symbol $a_{m_0,n_0}$ is transmitted and received.

To clarify, the precoding symbol as used in this embodiment can be interpreted to contain Information which at the receiver side correspond to data symbols, i.e., the precoding symbol is to carry certain bits of transmission data streams.

Next, it will be explained how the new transmission principle according to FIG. 7 can be utilized for the transmit diversity from orthogonal design for FBMC/OQAM. It should be noted however, that the transmission principle according to FIG. 7 is much more general, so that it is not limited to this specific application of transmit diversity but that there might be many other application areas.

FIG. 8 illustrates a system model with two transmit antennas where 2 complex-valued QAM symbols $s_1 = s_1^R + j \cdot s_1^I$ and $s_2 = s_2^R + j \cdot s_2^I$ are transmitted using four real-valued precoding symbols $x_1$, $x_2$, $x_3$, and $x_4$, two for each transmit antenna.

To simplify the notations, the ambiguity functions are also illustrated in the FIG. 8.

An arrow labelled $a_i$ from a first transmission resource to a neighbouring second transmission resource specifies that the first transmission resource Induces an Interference component with weight $w_i$ on the second transmission resource.

The present invention exploits such interference components from neighbouring resources by choosing precoding symbols, which are transmitted on the neighbouring resources, to deliver the desired quadrature components of the QAM symbols $s_1$ and $s_2$ by taking into account Alamouti design as follows:

$$y_{m_0,n_0} = H^{(1)}\left(s_1^R + j\overrightarrow{I_{m_0,n_0}^{(1)}}^{s_1^I}\right) + H^{(2)}\left(-s_2^R + j\overrightarrow{I_{m_0,n_0}^{(2)}}^{s_2^I}\right) + \eta_{m_0,n_0} \quad (20)$$

$$y_{m_0+1,n_0} = H^{(1)}\left(s_2^R + j\overrightarrow{I_{m_0+1,n_0}^{(1)}}^{s_2^I}\right) + H^{(2)}\left(s_1^R + j\overrightarrow{I_{m_0+1,n_0}^{(2)}}^{-s_1^I}\right) + \eta_{m_0+1,n_0}$$

In formula (20) there are four constraints and four unknowns (precoding symbols) and thus, these equations are solvable. From the construction of the constraints, transmitting precoding symbols obtained by solving the equations should lead to the equivalent system as Alamouti. Hence, a transmit diversity technique from orthogonal design is realized for FBMC/OQAM without rate loss.

To be more specific, formula (20) may be rewritten as follows:

$$y_{m_0,n_0} = H^{(1)}(s_1^R + j(w_1 x_1 + w_4 x_2 + I_{m_0,n_0}^{(1)'})) + H^{(2)}(-s_2^R + j(w_1 x_3 + w_4 x_4 + I_{m_0,n_0}^{(2)'})) + \eta_{m_0,n_0} \quad (21)$$

$$y_{m_0+1,n_0} = H^{(1)}(s_2^R + j(w_2 x_2 + w_3 x_1 + I_{m_0+1,n_0}^{(1)'})) + H^{(2)}(-s_1^R + j(w_2 x_4 + w_3 x_3 + I_{m_0+1,n_0}^{(2)'})) + \eta_{m_0,n_0} \quad (22)$$

where $w_1$, $w_2$, $w_3$, and $w_4$ are weights from the ambiguity functions (see FIG. 8) and where the following is introduced:

$$I_{m_0,n_0}^{(1)'} = I_{m_0,n_0}^{(1)} - w_1 x_1 + w_4 x_2$$

$$I_{m_0,n_0}^{(2)'} = I_{m_0,n_0}^{(2)} - w_1 x_3 + w_4 x_4$$

$$I_{m_0+1,n_0}^{(1)'} = I_{m_0+1,n_0}^{(1)} - w_2 x_2 + w_3 x_1$$

$$I_{m_0+1,n_0}^{(2)'} = I_{m_0+1,n_0}^{(2)} - w_2 x_4 + w_3 x_3 \quad (23)$$

and $I_{m_0,n_0}^{(1)}$, $I_{m_0,n_0}^{(2)}$, $I_{m_0+1,n_0}^{(1)}$, and $I_{m_0+1,n_0}^{(2)}$ are defined in a manner similar as in formula (6), for the antennas Tx1, Tx2, and for respective resource grids. The constraints in (20) can be explicitly written as $$w_1 x_1 + w_4 x_2 + I_{m_0,n_0}^{(1)'} = s_1^I$$

$$w_2 x_2 + w_3 x_1 + I_{m_0+1,n_0}^{(1)'} = s_2^I$$

$$w_1 x_3 + w_4 x_4 + I_{m_0,n_0}^{(2)'} = s_2^I$$

$$w_2 x_4 + w_3 x_3 + I_{m_0+1,n_0}^{(2)'} = -s_2^I \quad (24)$$

These equations can be rewritten as the following two sets of equations in a matrix-vector form as $$\begin{bmatrix} w_1 & w_4 \\ w_3 & w_2 \end{bmatrix} \begin{bmatrix} x_1 \\ x_2 \end{bmatrix} = \begin{bmatrix} s_1^I - I_{m_0,n_0}^{(1)'} \\ s_2^I - I_{m_0+1,n_0}^{(1)'} \end{bmatrix} \quad (25)$$

$$\begin{bmatrix} w_1 & w_4 \\ w_3 & w_2 \end{bmatrix} \begin{bmatrix} x_3 \\ x_4 \end{bmatrix} = \begin{bmatrix} s_2^I - I_{m_0,n_0}^{(2)'} \\ -s_1^I - I_{m_0+1,n_0}^{(2)'} \end{bmatrix}$$

These equation systems can be easily solved to obtain the desired precoding symbols $x_1$, $x_2$, $x_3$, and $x_4$ that satisfy those constraints above. Thus, (21) and (22) reduce to (1) and (2). This means that an equivalent system as Alamouti design is obtained, i.e. the system is orthogonal and without rate loss.

The advantage of the technology according to the embodiments presented herein is the ability to realize transmit diversity from the orthogonal design with full diversity, i.e. diversity order of 2 for two transmit antennas.

It will be readily apparent to the skilled person that the methods, the elements, units and apparatuses described in connection with embodiments of the invention may be implemented in hardware, in software, or as a combination of both. In particular it will be appreciated that the embodiments of the invention may be implemented by a computer program or computer programs running on a computer or being executed by a microprocessor. Any apparatus implementing the invention may in particular take the form of a computing device acting as a network entity. An apparatus for transmitting according to the embodiments of the invention may be implemented by a microprocessor or a signal processor, which is programmed to perform the signal processing steps and the modulating steps as described herein before. A signal processor suitably programmed thereby may be an implementation of a selector and a modulator according to embodiments of the invention. For that purpose the signal processor may<be connected to a memory comprising the program for when being executed enabling the microprocessor or signal processor or computer to act as an apparatus according to the embodiments of the invention, in particular as a selector and/or as a modulator or demodulator according to embodiments of the invention.

The invention claimed is:

1. A method for transmitting a multicarrier signal, the method comprising:
   transmitting the multicarrier signal,
   wherein said signal is of the offset quadrature amplitude modulation, OQAM, type comprising symbols in the time-frequency space,
   wherein the symbols include a data containing symbol and a precoding symbol,
   wherein the precoding symbol (x) is selected so that data is carried in both the in-phase and quadrature components of the data containing symbol (y) when received by a receiver, and
   wherein said data containing symbol in the time-frequency space is formed by modulating a real-valued symbol and an intrinsic interference corresponds to the imaginary part of the demodulated signal at said receiver and is constrained to carry data by a suitably selected value of said precoding symbol, or said data containing symbol in the time-frequency space is formed by modulating an imaginary-valued symbol and an intrinsic interference corresponds to the real-valued part of the demodulated signal at said receiver and is constrained to carry data by a suitably selected value of said precoding symbol.

2. The transmission method of claim 1, wherein
said offset quadrature amplitude modulation is applied with the filter bank multicarrier FBMC.

3. The transmission method of claim 1 where the selecting of the precoding symbol is performed in order to realize an orthogonal space-time or space-frequency code in a system using OQAM signalling.

4. The transmission method of claim 1,
wherein two complex-valued quadrature amplitude modulation QAM symbols $s_1, s_2$ are to be transmitted,
wherein real parts of the data containing QAM symbols $s_1, s_2$ are transmitted using resources $(m_0, n_0)$ and $(m_0+u, n_0+v)$ in the time-frequency domain by a first antenna;
wherein the real parts of the data containing symbols $-s_2, s_1$ are transmitted using resources $(m_0, n_0)$ and $(m_0+u, n_0+v)$ in the time-frequency domain by a second antenna; and
wherein u, v are non-zero.

5. The transmission method of claim 1,
wherein two complex-valued quadrature amplitude modulation QAM symbols $s_1, s_2$ are to be transmitted,
wherein real parts of the data containing QAM symbols $s_1, s_2$ are transmitted using resources $(m_0, n_0)$ and $(m_0+u, n_0)$ in the time-frequency domain by a first antenna;
wherein the real parts of the data containing symbols $-s_2, s_1$, are transmitted using resources $(m_0, n_0)$ and $(m_0+u, n_0)$ in the time-frequency domain by a second antenna; and
wherein u is non-zero.

6. The transmission method of claim 1,
wherein two complex-valued quadrature amplitude modulation QAM symbols $s_1, s_2$ are to be transmitted,
wherein real parts of the data containing QAM symbols $s_1, s_2$ are transmitted using resources $(m_0, n_0)$ and $(m_0, n_0+u)$ in the time-frequency domain by a first antenna;
wherein the real parts of the data containing symbols $-s_2, s_1$, are transmitted using resources $(m_0, n_0)$ and $(m_0, n_0+u)$ in the time-frequency domain by a second antenna; and
wherein u is non-zero.

7. The transmission method of claim 4, wherein one precoding symbol is used for each QAM symbol transmitted by each antenna, wherein the precoding symbols are selected to force the intrinsic interference at the receiver to deliver desired real or imaginary components of the transmitted symbols to transmit useful data by the intrinsic interference part of the transmitted symbols when received by the receiver.

8. An apparatus for transmitting a multicarrier signal wherein said signal is of the offset quadrature amplitude modulation, OQAM, type comprising symbols in the time-frequency space, the apparatus comprising:
a transmitter for transmitting the multicarrier signal,
wherein the symbols include a data containing symbol and a precoding symbol, and
wherein a selector for selecting the precoding symbol (x) so that data is carried in both the in-phase and quadrature components of the data containing symbol (y) when received by a receiver; and
a modulator for forming said data containing symbol in the time-frequency space by modulating a real-valued symbol and an intrinsic interference corresponds to the imaginary part of the demodulated signal at said receiver and is constrained to carry data by a suitably selected value of said precoding symbol, or
said modulator for forming said data containing symbol in the time-frequency space by modulating an imaginary-valued symbol and an intrinsic interference corresponds to the real-valued part of the demodulated signal at said receiver and is forced to carry data by a suitably selected value of said precoding symbol.

9. The apparatus of claim 8, further comprising the features as defined in claim 8, wherein said offset quadrature amplitude modulation is applied with the filter bank multicarrier FBMC.

10. A method for receiving a multicarrier signal which is transmitted according to the method for transmitting according to claim 1,
the method for receiving comprising data being obtained from demodulating the in-phase and quadrature components of the data containing symbol, when received by a receiver.

* * * * *